Dec. 17, 1940.    R. CHILTON    2,225,098
DYNAMIC DAMPER GUIDED FOR TRANSLATIONAL AND POLAR MOVEMENT
Filed May 16, 1939
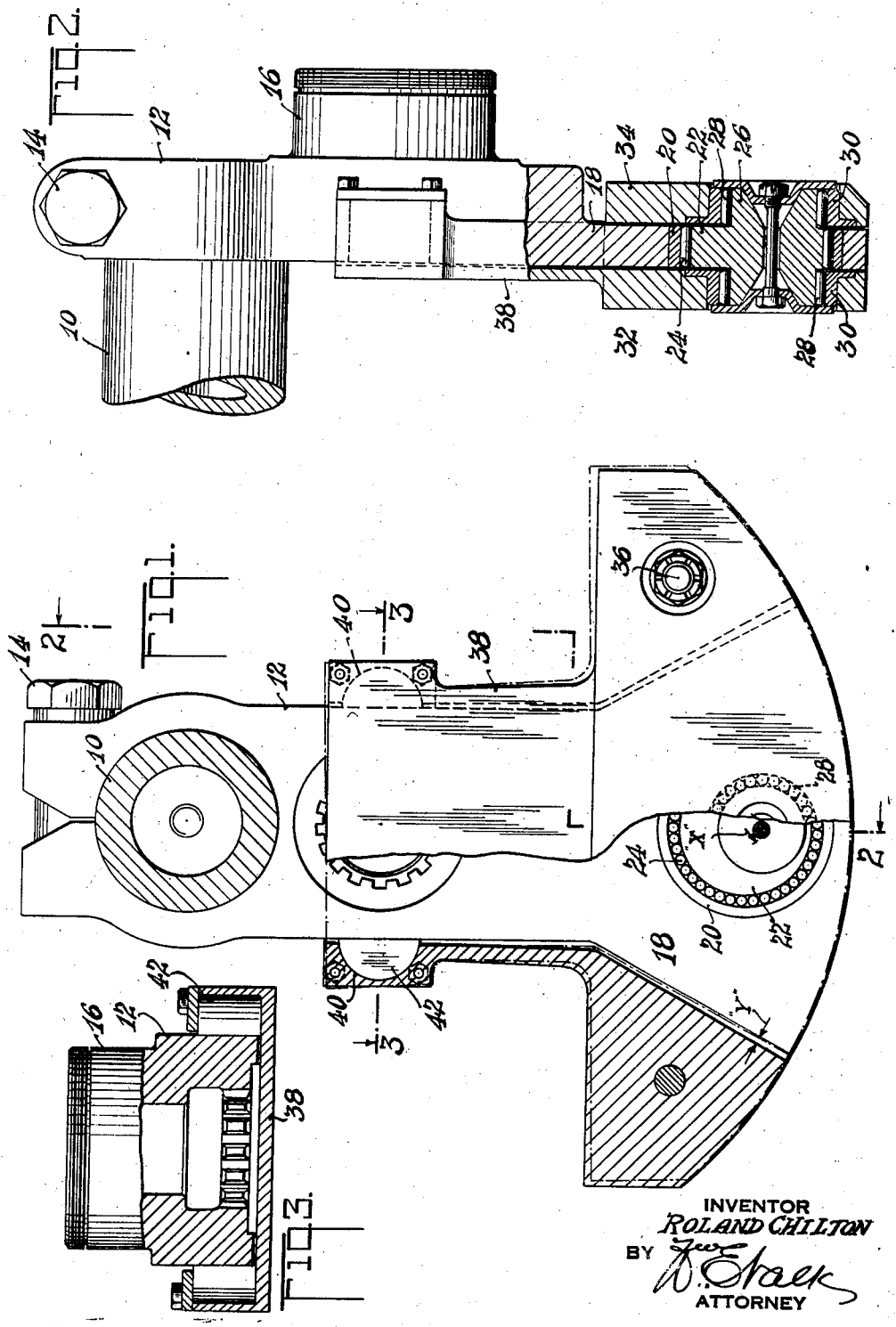
INVENTOR
*ROLAND CHILTON*
BY
ATTORNEY Patented Dec. 17, 1940

2,225,098

UNITED STATES PATENT OFFICE 2,225,098

DYNAMIC DAMPER GUIDED FOR TRANSLATIONAL AND POLAR MOVEMENT

Roland Chilton, Ridgewood, N. J., assignor to Wright Aeronautical Corporation, a corporation of New York Application May 16, 1939, Serial No. 273,855

6 Claims. (Cl. 74—604)

This invention relates to dynamic dampers and comprises improvements on the structures in Chilton Patents Nos. 2,127,462 and 2,112,984 and more particularly in the patent of M. B. Bleecker No. 2,146,524 issued February 7, 1939, from which the following is quoted to summarize the problems and the underlying teachings of this invention.

"It is known that if a pendulum mass is suspended from a rotating shaft, so as to be stabilized by centrifugal force, the frequency of pendulum swing goes up with the speed of rotation so that the pendulum makes a constant number of swings per crankshaft revolution. It is also known that if the frequency of such a pendulum is made synchronous to the frequency of the torque impulses to which the shaft is subjected, then the pendulum will automatically swing 180° out of phase with the impressing force which is, accordingly, counterbalanced to the suppression of torsional vibration.

"In radial engines, the relatively large counterweight masses used have been converted to dynamic torsional damping by suspending the mass to swing without rotational component about the appropriate small radius which, in the case illustrated, is of the order of ⅜". This short pendulum length, necessary to give the required high frequency, cannot be obtained in a body of the size of the normal counterweight by a conventional simple single point pivotal suspension because of the large radius of gyration of these weights (over 3"). It is known that the highest frequency that can be obtained by simple single point suspension is that when the pendulum length equals the radius of gyration which is obviously much too great a pendulum length for the present purpose.

"Accordingly, a 'bi-filar' suspension has been resorted to, and according to the teachings of the patent of Chilton No. 2,112,984, this comprises rollers loosely engaging pairs of spaced holes in the crankshaft and weight whereby arcuate paths are defined by the difference of the diameter of the roller and the engaged holes and the weight swings without rotational or polar component. This construction has gone into extended and successful use.

"The (Bleecker) invention teaches an improved novel means whereby a single eccentric supporting means may be used at the (lateral) center of the weight and the weight stabilized by a torque arm articulated to the shaft member. While not entirely suppressing polar or rotational movement of the weight, this yet reduces the angular amplitude to a small value which is determinate. With any given radius of eccentric suspension, this polar movement slows down the frequency of pendulum swing so that the eccentric radius is, accordingly, reduced to bring the frequency back to the desired figure to synchronize with the disturbing impulses."

In the Bleecker structure, the polar movement of the weight imposes forces of considerable magnitude on the articulation of the torque arm to the shaft and the present invention teaches that these forces may be greatly reduced:

(a) By disposing of the eccentric supporting means, not merely at the lateral center of the counterweight but also at its center of percussion when oscillating about the point of articulation, and (b) By increasing the length of the torque arm, the preferred embodiment of the drawings showing a torque arm embracing the crankshaft extension so that the articulation may be brought up to the center of rotation of the crankshaft or even therebeyond. This construction, at the same time, affords an efficient strength/weight ratio in the torque arm member.

The objects and advantages of the invention will be obvious from the foregoing preamble and from the following description with reference to the drawing, in which:

Fig. 1 is an end view in part section through the counterweight;

Fig. 2 is a side view in part section on the line 2—2 of Fig. 1, and

Fig. 3 is a section on the line 3—3 of Fig. 1.

In the drawing, 10 designates the crankpin of a conventional crankshaft to which there is secured a rear cheek 12 by the usual clamp bolt 14. The crankcheek 12 is provided with the usual rear journal 16 and has an extension or counterweight arm 18 in which is formed a bore to receive a roller race 20 in which is mounted an eccentric 22 by means of rollers or needles 24. The eccentric 22 has integral pins 26, the eccentricity of which defines the desired radius of pendulum swing indicated at X, Fig. 1, and the pins are provided with roller bearings 28 engaging suitable bushings 30 fitted in counterweight members 32—34 conveniently secured together by bolts 36 to embrace the extension 18 with a clearance indicated at Y which is made more than the normal amplitude of pendulum oscillation.

In the present invention the torque arm consists of the box-like structure 38 extending upwards from one counterweight member 32 and loosely embracing the crankcheek 12 as shown. At its upper end this extension member is provided with semi-cylindrical pockets 40 in which are fitted half cylindrical members 42, these members being free for slight oscillation in the pockets 40 and for slight vertical sliding against the engaged surfaces of the extension 12. This articulation means may be disposed on the line 3—3 which passes through the center of rotation of the crankshaft so that the slight rotational component of the counterweight is radial about the crankshaft axis.

The eccentric pins 26 are disposed as near as practicable to the center of percussion of the counterweight relative to the center of articulation and with these provisions there results a minimum of force reaction on the articulation 40—42, which is one of the objectives of the invention.

It will now be seen that the path of travel of points remote from the suspension point are slightly modified from the arc X, due to the small rotational component introduced by the method of stabilizing by means of a torque arm, and this polar movement will slightly reduce the natural frequency of the weight as a pendulum as compared to the purely parallel mode of vibration obtained with the "bi-filar" suspension of the prior art. This reduction in frequency is, accordingly, compensated for by making the radius X of the eccentric less than would be appropriated for "bi-filar" suspension having strictly non-rotational vibration.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. The combination with a crankshaft and a counterweight thereon organized for limited relative motion, of guiding means therebetween effective at the center of rotation of the crankshaft to confine the weight to substantially radial swing thereabout, and weight supporting means engaging the shaft and the weight at the center of percussion of the weight defining an arcuate path of travel thereof.

2. In combination, a crankshaft having an extension member, a counterweight loosely embracing said extension, said embracement in part extending inwardly toward the center of rotation of the shaft, articulation means at the shaft center to prevent lateral movement of the weight thereat, and counterweight mounting means spaced from said articulation means and at the center of percussion of the weight defining an arcuate path of pendulum swing at the center of percussion of said counterweight.

3. The combination with a crankshaft member and a counterweight member, one embracing the other, of means spaced from the shaft center having relatively eccentric journals in bearing engagement with respective members for suspending said counterweight from said crankshaft and defining an arcuate path of travel of the counterweight at the journal engagement, and means to limit angular swing of said weight about the journal engagement to a relatively small angle compared to the angular excursion of said eccentric, said means comprising a torque arm on the counterweight member in part embracing the crankshaft member at the shaft axis and spaced means carried by the arm and articulately engaging the shaft member the opposed points alined with the shaft axis.

4. In a shaft system including a counterweight mass carried thereby and guided for movement relative thereto at two points, one guiding means constraining a portion of the counterweight to radial movement across and at the shaft center, and another guiding means constraining the counterweight, at its center of percussion, to movement in an arcuate path whose radius is less than the dimension from the shaft center to the center of percussion of the counterweight.

5. In combination in a shaft system, a counterweight, radially displaced relative to the shaft center, centrifugally resistant means spaced from the shaft center supporting the counterweight for free movement in an arcuate path and disposed at the center of percussion of the counterweight, and means at the shaft center for stabilizing said counterweight against tipping and for constraining the counterweight to radial movement at the shaft center.

6. In combination, a shaft member having an extension thereacross, a counterweight embracing the extension in a region radially spaced from the shaft center, a box-like member integral with the counterweight and extending across the shaft center, articulated bearing blocks carried by the box-like member and bearing upon opposite sides of the extension and alined with the shaft center to constrain said box-like member from lateral displacement from the extension, and means between the extension and counterweight proper, radially spaced from the shaft center, supporting the counterweight on the extension for pendular swing.

ROLAND CHILTON.